INVENTOR.
GEORGE MELLING Sr.
BY Earl D Chappell
ATTORNEYS

July 30, 1946.  G. MELLING, SR  2,404,859
MACHINE TOOL
Filed March 9, 1944   5 Sheets-Sheet 2
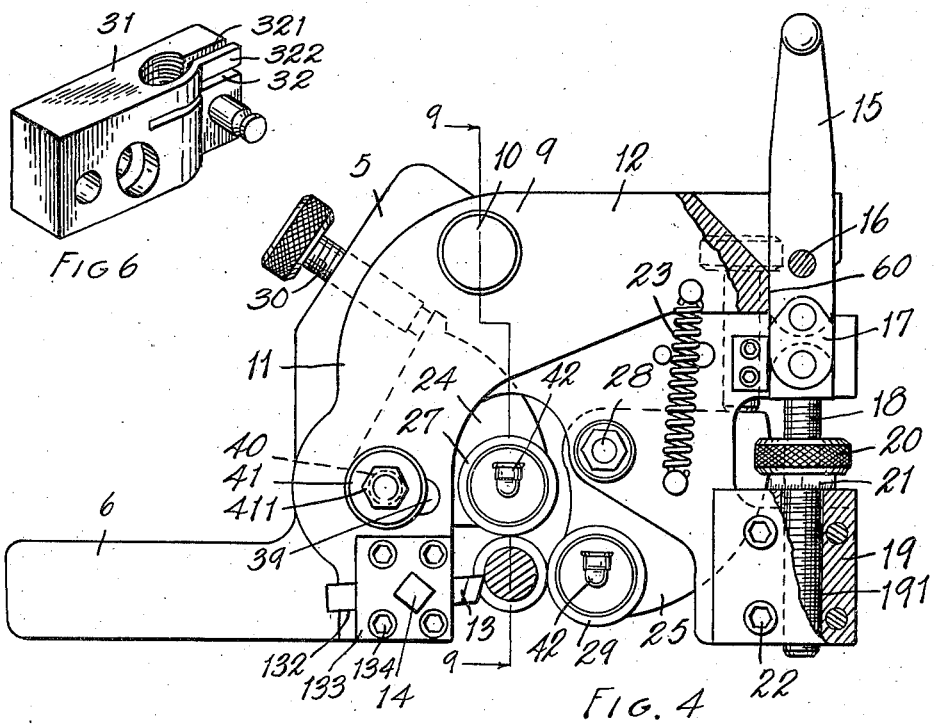
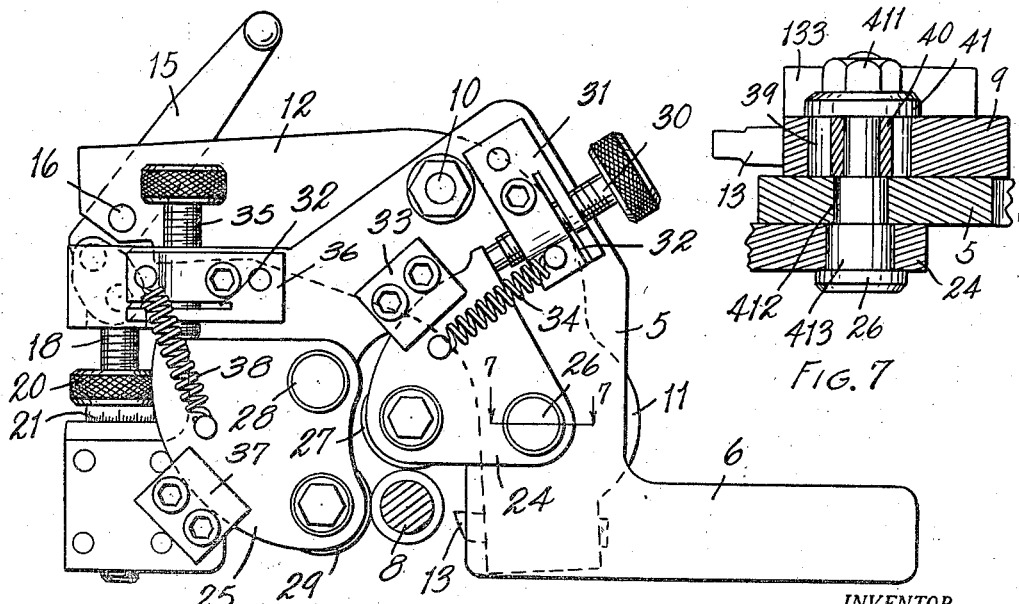
INVENTOR.
GEORGE MELLING SR.
BY Earl T Chappell
ATTORNEYS

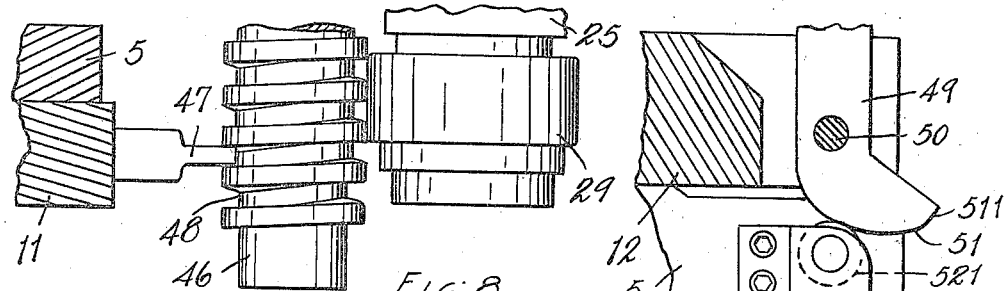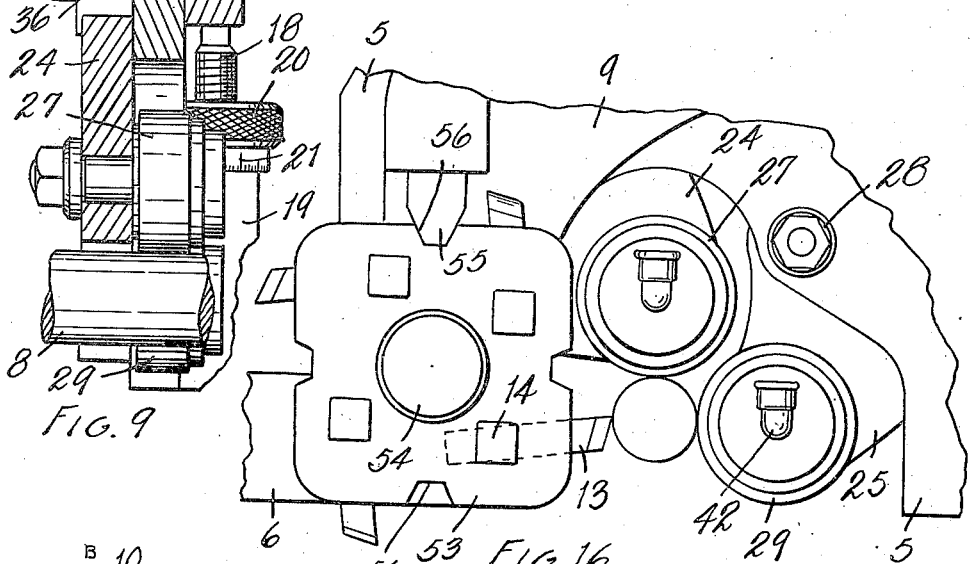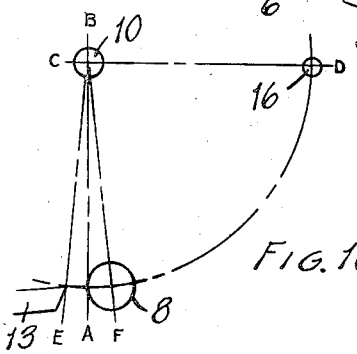

July 30, 1946.   G. MELLING, SR   2,404,859
MACHINE TOOL
Filed March 9, 1944   5 Sheets-Sheet 4
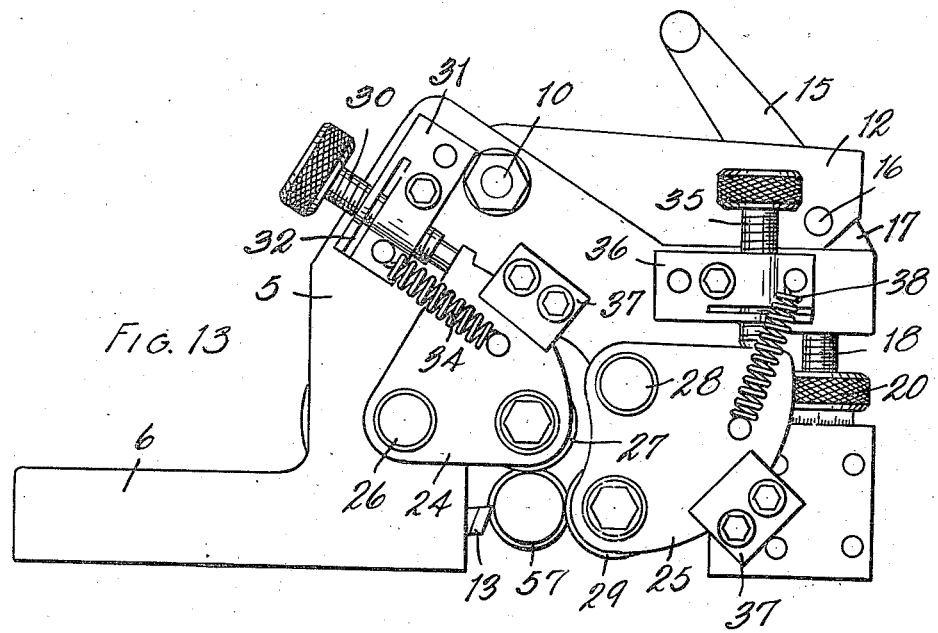
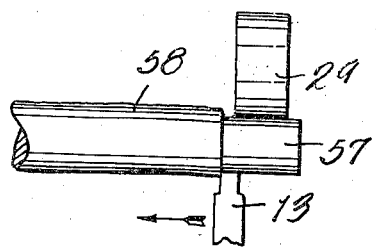
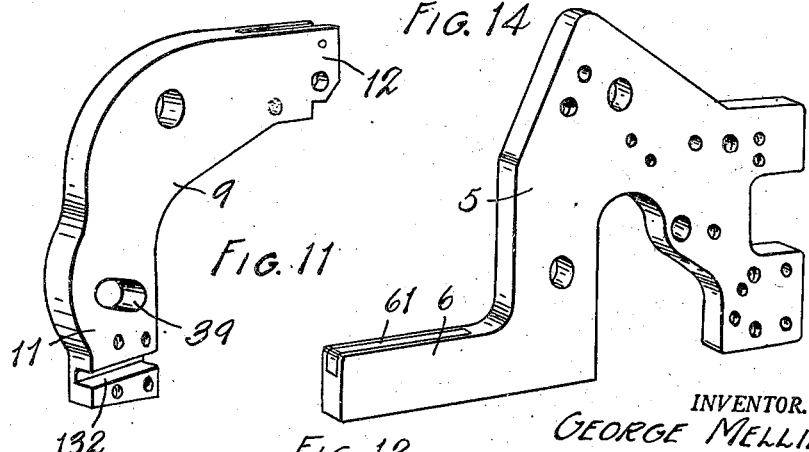
INVENTOR.
GEORGE MELLING SR
BY
Earl D. Chappell
ATTORNEYS

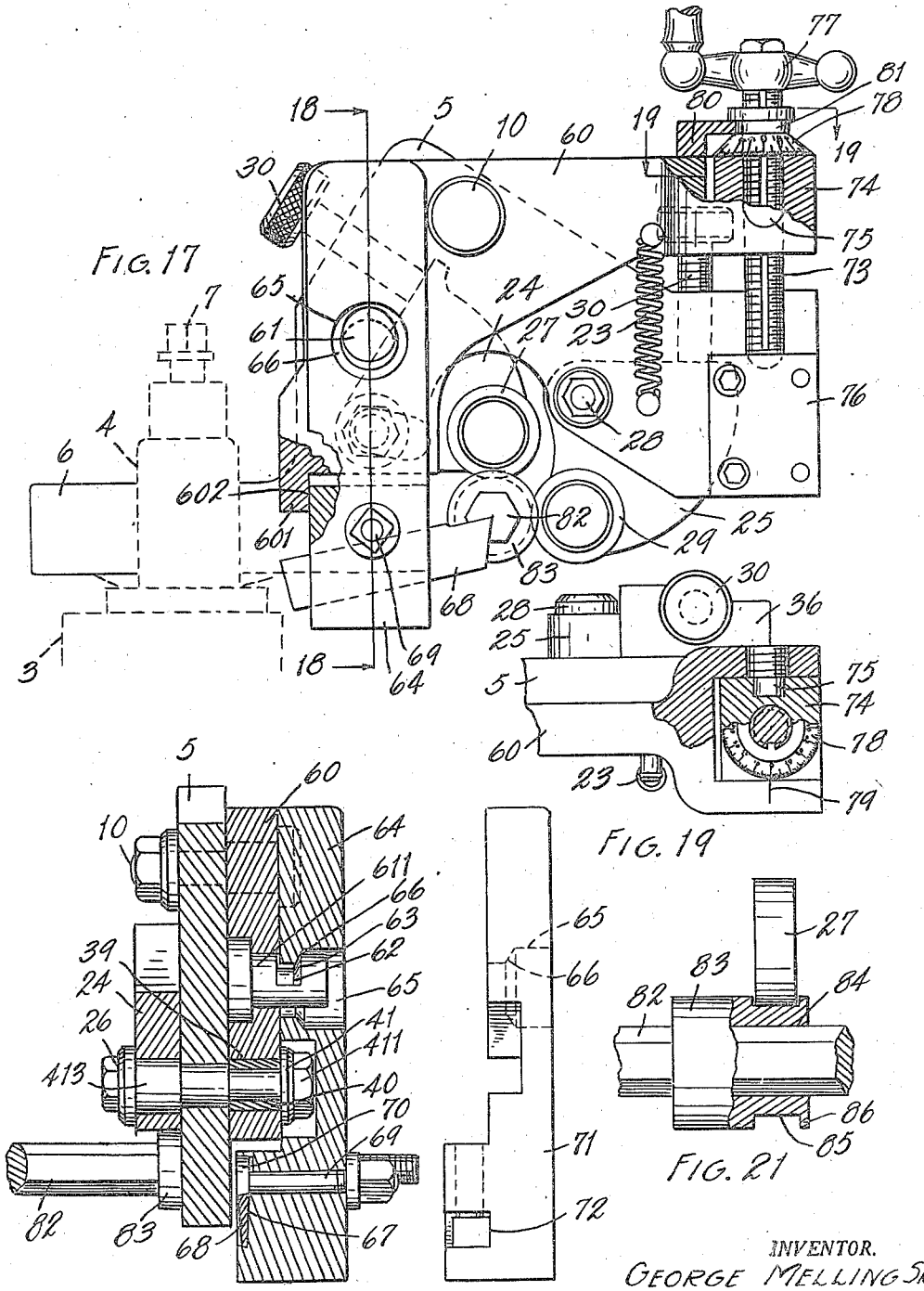

Patented July 30, 1946

2,404,859

UNITED STATES PATENT OFFICE 2,404,859

MACHINE TOOL

George Melling, Sr., Jackson, Mich.

Application March 9, 1944, Serial No. 525,677

25 Claims. (Cl. 82—34)

This invention relates to improvements in machine tools.

The main objects of this invention are:

First, to provide a machine tool structure or fixture which is readily applied or adapted to lathes and like machines now widely used.

Second, to provide an improved machine tool fixture the use of which results in the production of work with great accuracy or to meet close tolerance allowances.

Third, to provide a fixture which may be installed in an engine lathe or the like in approximately the time required for adjusting the commonly used type of tool holder.

Fourth, to provide a structure having these advantages which has a wide range of adaptations for work of different sizes and for the performing of different machine operations.

Fifth, to provide a structure having these advantages which avoids the necessity for preliminary work in fitting the stock for the machine operations.

Sixth, to provide a structure which results in extreme accuracy for the full length of the work such as a shaft or long screw when turning or threading.

Seventh, to provide a fixture for lathes and the like which enables the taking of deep cuts without springing or distortion of the work.

Eighth, to provide a fixture in which the cutting stresses are effectively sustained closely adjacent the plane of the cutter so that the work does not spring or distort and clean cuts result—that is, cuts without objectionable tool marks.

Ninth, to provide a machine tool fixture having these advantages which avoids the necessity of supporting the work by means of a tail stock and enables work operation close to the head stock and to the tail stock when a tail stock is used.

Tenth, to provide a machine tool fixture which may be efficiently operated by relatively unskilled workmen, or by unskilled workmen with a minimum of supervision and adjustment to the work.

Eleventh, to provide a tool fixture for lathes which adapts the lathe for many machine operations commonly deemed to require a screw machine.

Twelfth, to provide a tool fixture having the above stated advantages which is adapted for use in machining stock of various cross sections, an adapter being provided so that the machine may work effectively on non-circular stock as well as on stock of circular section.

Thirteenth, to provide a machine tool fixture which is adapted for various types of tools and for the taking of various types of cuts—that is, cut-off tools, forming tools, tools taking wide cuts, and the like.

Objects relating to details and economies of the invention will appear from the description to follow. The invention is defined in the claims.

Preferred embodiments of the invention are illustrated in the accompanying drawings, in which:

Fig. 4 is a fragmentary side elevation of a fixture embodying features of my invention looking from the right of Fig. 1, with the tool adjusted to the work, parts being broken away and sectioned.

Fig. 5 is a side elevation of a fixture embodying features of my invention, looking from the opposite side from that shown in Fig. 1 and with the tool retracted, the work being sectioned.

Fig. 6 is a perspective view of one of the self-locking supporting blocks or nuts for one of the adjusting screws.

Fig. 7 is a fragmentary view partially in section on line 7—7 of Fig. 5 illustrating structural details and relationship of certain parts.

Fig. 8 is a fragmentary view partially in horizontal section illustrating the structure as adapted for use as a thread cutter or for forming a threaded shaft.

Fig. 9 is a fragmentary view partially in section on the broken line 9—9 of Fig. 4.

Fig. 10 is a diagrammatic view illustrating the relation of the tool and tool holder to the work and the path of travel of the tool from its fully retracted position to its fully advanced position.

Fig. 11 is a perspective view of the body portion of the tool holder.

Fig. 12 is a perspective view of the fixture bracket or support.

Fig. 13 is a side elevation of an adaptation of the invention in which the parts are arranged so that the work rests coact with the finished part of the work, various parts being reversed relative to the supporting bracket from the position shown in the preceding figures.

Fig. 14 is a fragmentary view illustrating the relation of certain of the parts shown in Fig. 13.

Fig. 15 is a fragmentary view partially in section showing a modified form or embodiment of the invention, the modification being mainly in the tool operating lever and its directly associated parts.

Fig. 16 is a fragmentary side elevation of a modified form or embodiment of the invention, the modification being mainly in the tool holder.

Fig. 17 is a side elevation partially in section and partially broken away of a modified form or embodiment of my invention enabling the adaptation of a wide variety of tools, the structure also being especially adapted for use where heavy cuts are desired and uniform manual fittings of the tool to the work.

Fig. 18 is a fragmentary view mainly in section on line 18—18 of Fig. 17.

Fig. 19 is a fragmentary view partially in section on line 19—19 of Fig. 18.

Fig. 20 is a front elevation of a tool holder fixture adapted for receiving a different type of tool than that illustrated in Fig. 18.

Fig. 21 is a fragmentary view partially in section illustrating an adapter for use in the machining of stock of non-circular section.

Figure 1:
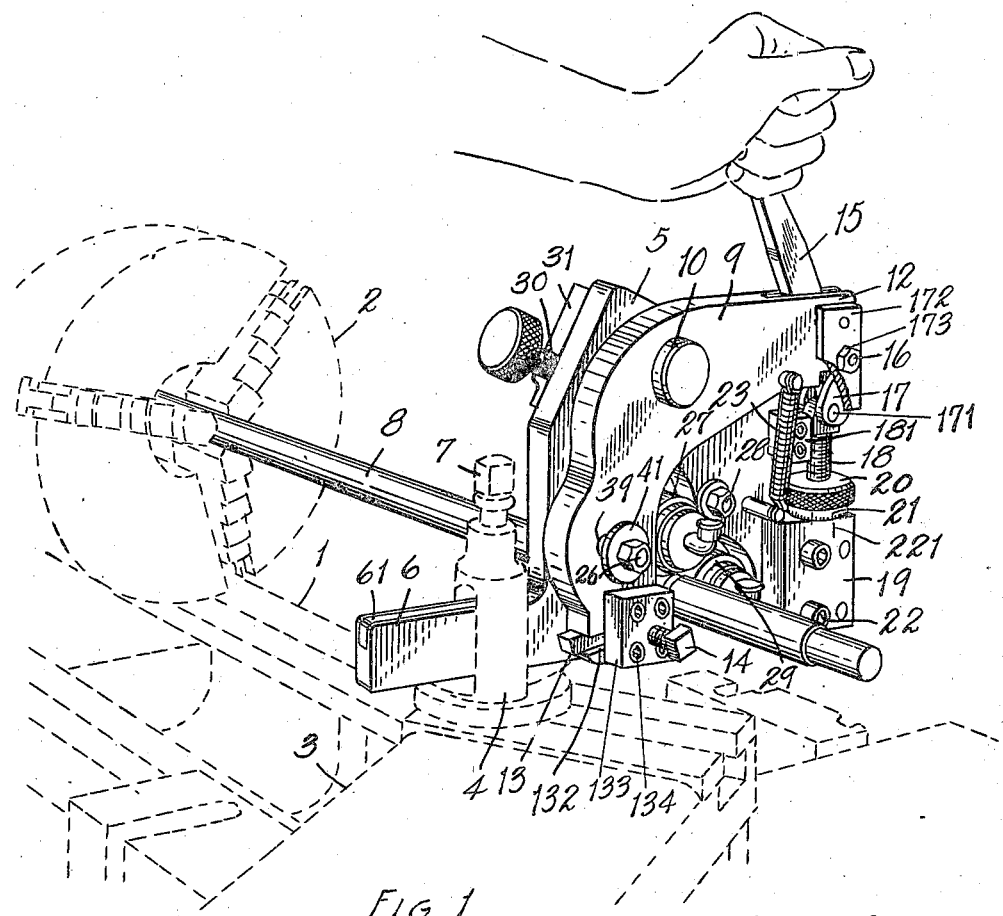
Fig. 1 is a fragmentary perspective view of a lathe embodying the features of my invention, parts of the lathe, the head stock and tool carriage and post being indicated by dotted lines, certain of the steps of manipulation being illustrated by a hand grasping the tool actuating lever.

In the accompanying drawings, 1 represents the bed of a lathe, 2 the head stock, 3 the tool carriage, and 4 the tool post adjustably mounted on the carriage. The details of the head stock, carriage and tool post are not illustrated as they may be of conventional or known design or structure and one of the great advantages of the invention is adaptability to engine lathes and the like now widely used.

The combined tool holder and work rest support 5 is provided with a shank 6 adapted to be inserted in the tool post 4 and clamped therein by the screw 7. The shank of the tool holder is provided with a hardened insert 61 to sustain the wear and thrust of the tool post screw. The support 5 is yoke-shaped to overhang the work 8 which is chucked into the head stock, the work illustrated in Fig. 1 being a piece of round rod stock. It will be understood that ordinarily work of this kind is further supported by a tail stock but one of the advantages of this invention is that it is not necessary to use a tail stock although it may be used where desired.

The tool holder 9 is pivoted at 10 on the support 5. This tool holder is of bell crank or angled shape, the pivot 10 being at the angle thereof and so located on the support that the arm 11 of the tool holder depends at the side of the work with the arm 12 thereof projecting rearwardly over the work. The tool holder is adapted to receive the desired tool, as 13, which is secured by means of the set screw 14.

Adjusting means for the tool holder in the preferred embodiment illustrated comprise the lever 15 which is pivoted to the arm 12 of the tool holder at 16 and is connected by the toggle link 17 to the micrometer screw 18. The micrometer screw is slidably mounted in bore 191 of the thrust block or member 19 and is provided with a micrometer thrust nut 20, calibrated as indicated at 21. The thrust block is provided with an index pointer 221. The member 19 is secured to the support 5 by clamping screws 22. The spring 23 acts to urge the tool away from the work so that when the lever 15 is actuated to release the tool the spring retracts the tool holder. In Fig. 1, I have illustrated the manipulation of this lever 15. To limit the movement of the toggle past center a stop 181 is provided on the arm 12. With the toggle in the fully extended position and the tool in the cutting position, as for example in screw cutting, it remains there until the toggle is broken by the manipulation of the lever 15. By means of the adjusting screw, the depth of the cut can be very accurately adjusted.

The operating connections for the lever to the tool holder and support provide very powerful means for feeding the tool to the work, for example where it is initially necessary to bring the tool to the proper depth of cut—for example, in the making of a screw. The relationship of the cutting edge of the tool to the pivot of the tool holder and to the pivot for the operating lever to the tool holder should be noted and this is diagrammatically illustrated in Fig. 10 in which the pivot 10 for the tool holder is illustrated, the pivot connection for the operating lever 16 to the tool holder and the work and the swinging movement of the tool. BE illustrates the retracted position of the tool and BF the fully advanced position and BA the point of engagement of the tool with the work, and CD the link or actuating arm of the tool holder. It will be noted that the cutting edge of the tool swings in an arc of a circle centered in the tool holder pivot and that this circle passes through the actuating lever connection to the tool holder. This results in a very effective presentation of the tool to the work and very slight variation of the tool relative to the work as it is moved to and from the axis of the work.

To support the work against the cutting stress and to prevent vibration and chattering and properly support the work relative to the tool, I provide a pair of work rests 24 and 25, the work rest 24 being pivoted at 26 on the support and provided with a work engaging roller 27. The work rest 25 is pivoted at 28 and is provided with a work engaging roller 29. The relative relation of these work rests to each other and to the cutter and to the work is clearly illustrated in the drawings, and it will be noted that the work rest 24 engages the work at approximately 90° angular relation relative to the tool while the work rest 29 engages the work at approximately 180° angular relation to the tool.

With this arrangement, the cutting thrusts and stresses of the tool are absorbed or sustained in the work by the work rests which are arranged in a plane or in planes closely adjacent the plane of the tool.

The work rest 24 is provided with an adjusting screw 30 threaded into a nut member 31 mounted on the side of the support 5. This nut member has an integral lock element 322 resulting from forming the intersecting slots 32 and 321, see Fig. 6. After the slots are formed, the resulting tongue-like member 322 is sprung inwardly and provides a friction locking or retaining means for the screw. A lateral thrust or guide member 33 is secured to the side of the support to coact with the pivot 26, pivotally supporting the work rest under load. The retracting spring 34 acts to retract the work rest from the work when the adjusting screw 30 is backed off or retracted.

The work rest 25 has an adjusting screw 35 threaded into a nut member 36 similar to that described, a side guide slide thrust member 37 being provided and also a retracting spring 38.

It is desirable to prevent lateral thrust on the tool holder and to enable this the tool holder is provided with a segmental slot 39 engaged by the pivot 26 which has a spacer 40 thereon secured by the thrust washer 41 and the nut 411. The spacer is of such dimension as to allow freedom of movement of the tool holder when the thrust members are clamped together. It will be noted that the work rest 24 is mounted on the pivot 26 which is a through bolt arranged in the holder 412 in the support 5, see Fig. 7, shouldered to provide a pivot portion 413 for the work rest, further shouldered or stepped to receive the spacing sleeve 40, the washer 41 being clamped against the end of this sleeve by means of the nut 411, see Fig. 7. The work holders are preferably provided with oil cups 42.

Figure 2:
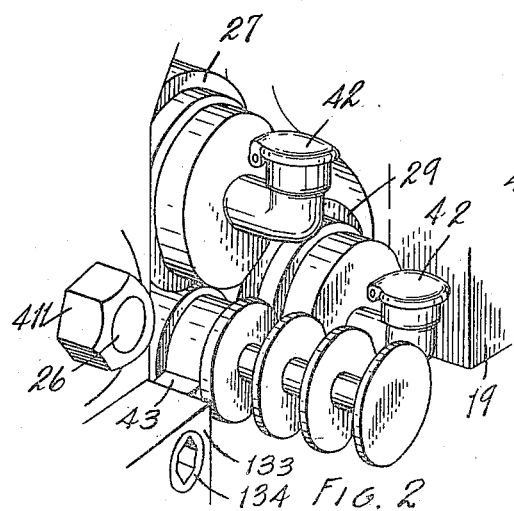
Fig. 2 is a fragmentary perspective view illustrating the relation of certain of the parts to a piece of work.

In Fig. 2 I illustrate the tool 43 as taking a cut the full width thereof, certain operations being completed on the work and others partially completed.

Figure 3:
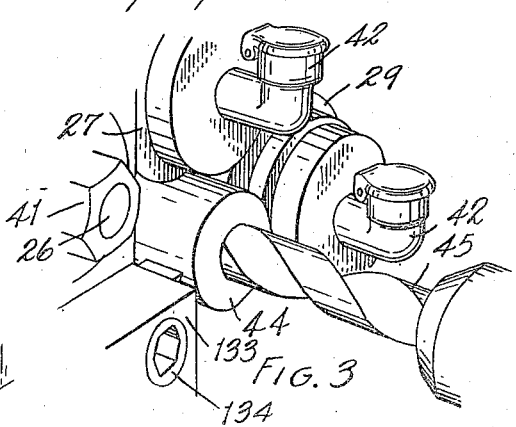
Fig. 3 is a fragmentary perspective view illustrating other work operations, in this particular instance the boring or drilling of the work.

In Fig. 3 the work 44 is supported by the tool and the work rest, the tool being adjusted merely to serve as a support or the tool merely as a truing tool, the primary object being to drill or bore the work as by means of the drill 45.

In Fig. 8 the work 46 illustrated is a screw and the tool 47 being of suitable character to cut the screw thread 48. The work rests are in the same relation as described.

In the embodiment of my invention shown in Fig. 15 the tool actuating lever 49 is pivoted at 50 to the work holder and has a cam 51 in thrust engagement with the roller 521 on the adjusting screw 52, the adjusting screw being provided with a nut 20 having micrometer adjustment as in the embodiment described. The thrust block 181 sustains the lateral thrust of the actuating lever on the adjusting screw 52. The lever is provided with a dwell 511 which engages the roller when the lever is in fully actuated position.

In Fig. 16 a multiple tool carrying head 53 is provided, this being pivoted on the tool holder at 54, a detent 55 carried by the tool holder being adapted to be selectively engaged with the annular recesses 56. The tools may be of different types or adjusted at different positions for performing their desired operations on the work.

In Figs. 13 and 14 I illustrate an embodiment of my invention in which the work rests are arranged so as to coact with the finished portion 57 of the work 58, this being desirable where the stock is irregular as illustrated at 58. The parts are substantially the same as described with the exception that the tool recess 132 of the tool holder must be on the opposite side of the holder from that of the embodiment previously described.

This arrangement also permits cutting operations very close to the head stock. It will be noted that the complete fixture or unit is relatively thin which enables performing of the work operations upon the work close to the head and tail stock or close to a shoulder or flange which are found on some classes of work.

In the preferred embodiment illustrated, the tool holder is provided with a slot-like laterally opening recess 132, a block 133 being secured to the side of the tool holder over this recess by means of the screws 134, this block being adapted to receive the tool clamping screw 14. This permits the use of tools varying considerably in width and even tools wider than the slot 132 might be used by changing the block 133 or providing a slot therein registering with the slot 132.

My improved machine tool or tool fixture is capable of a wide variety of advantageous uses and is readily adapted for various types of work. It greatly increases the output of standard types of engine lathes and enables the rapid production of work with extreme accuracy or close tolerances. The work engaging rollers and the work rests provide a substantially anti-friction support for the work. The fixture may be installed in an engine lathe in substantially the same length of time required for installing the regular type of tool holder. The work rests are so positioned as to take the thrust of the cutter to prevent vibration and chattering. The work rests do not mar or score the work. As stated, the work is effectively supported without the use of a tail stock which is commonly necessary to provide and which is very difficult to adjust to maintain accurate results.

In the embodiment of my invention shown in Fig. 17, the tool holder 60 is provided with a stud 611 having a recess 62 in the upper side thereof beveled or cammed at 63. A thrust block 601 is provided to engage the tool supporting fixture at 602. The tool supporting fixture 64 is adapted to fit against the side of the tool holder 60 and is provided with a bore 65 having a cammed shoulder 66 adapted to be engaged with the cam 62 of the stud, this acting to draw the fixture 64 firmly against the side of the tool holder. The tool holder has a seat 67 for a tool 68 which, in the embodiment illustrated, is a cutting-off tool. The tool is clamped on its seat by means of clamping bolt 69 having a clamping head 70. It is contemplated that a tool fixture shall be provided for each shape or type of tool, for illustration, the fixture 71 in Fig. 20 is provided with a seat 72 adapted to receive a relatively wide tool. In some forcing tools and for other work, wide cuts are required and considerable manual effort may be involved in fitting the tool to the work. To meet such conditions I provide a tool holder feed screw 73 which is threaded through a nut or block 74 pivoted at 75 on the rearwardly projecting end of the lever. This pivot is arranged in the same relation to the pivot of the tool holder as is described for the pivots for the levers 15 and 49. The screw has abutting engagement with the thrust block 76 on the support. The screw is provided with a hand piece 77 for convenient manipulation. To aid in gauging the adjustment of the screw, the graduated dial member 78 is splined to the screw for rotation therewith, a pointer 79 being provided to indicate the turns made on the screw.

With this arrangement, the same relation of parts is maintained throughout the stroke of the tool holder and a powerful feed means is provided for the tool—that is, one that requires relatively small effort on the part of the operator.

The bracket 80 engages a groove 81 in the dial member, keeping the dial member in proper relation to the index 71.

It is frequently desirable to use the fixture on non-circular stock of various cross sections, the stock 82 shown in Fig. 21 being of hexagonal section. In such case, an adapter 83 is provided, this adapter having a bore 84 conformed to the cross section of the stock and having a cylindrical surface 85 with flanges 86 at the ends thereof, this cylindrical surface 85 being engaged by the work rest rollers 27 and 29, only one of course being shown in Fig. 21. This adapter is moved along the work by the work rests so that the work is effectively supported as is the case when the stock is engaged directly by the work rests.

My tool fixture may be supplied as a complete unit. While it is adapted for use on quite a wide range of work—that is, work in which the stock is of considerable range in diameter, it is of course not contemplated that one fixture would be universal for all sizes of stock. However, as stated, it is adapted for a wide variation and may be mounted on lathes now in wide use, adapting them for various operations for which they are not now well adapted and for the performing of various operations which either require special fixtures and set-up if performed on a lathe or for operations requiring screw machine equipment.

Another advantage is that great skill on the part of the operator is not required for successful operation and greatly increased output is possible as compared with lathes and their fixtures now widely used. Further, the quality of work is very greatly improved as distortions are avoided and clean cuts may be made.

I have illustrated and described highly practical embodiments of my invention. I have not attempted to illustrate or describe other adaptations or embodiments as it is believed that this disclosure will enable those skilled in the art to embody or adapt my invention as may be desired.

Having thus described my invention, what I claim as new and desire to secure by Letters Patent is:

1. In a machine of the class described including a head stock, a tool carriage and a tool post adjustably mounted on said tool carriage, the combination of a combined tool holder and work rest support mounted on said tool post to overhang work driven by the head stock, an angled lever-like tool holder pivotally mounted on said support at the angle thereof with one arm depending at the side of the work, a tool mounted on the depending arm of said tool holder, a tool holder adjusting lever pivoted on its other arm, a retracting spring for said tool holder, a micrometer screw on said support provided with a calibrated adjusting nut, a link connection for said adjusting lever to said micrometer screw, a work rest pivotally mounted on said support and provided with a roller positioned to engage the work in approximately 180° angular relation to said tool, a retracting spring for said work rest, an adjusting screw for said work rest, a second work rest pivotally mounted on said support and provided with a roller adapted to engage the work at approximately 90° angular relation to said tool, a retracting spring for said second work rest, an adjusting screw for said second work rest, said work rests and tool coacting to laterally support the work and said work rests acting to sustain the cutting thrust and stresses of the tool upon the work.

2. In a machine of the class described including a head stock, a tool carriage and a tool post adjustably mounted on said tool carriage, the combination of a combined tool holder and work rest support mounted on said tool post to overhand work driven by the head stock, an angled lever-like tool holder pivotally mounted on said support at the angle thereof with one arm thereof depending at the side of the work, a tool mounted on the depending arm of said tool holder, a tool holder adjusting lever pivoted on its other arm, a micrometer screw on said support provided with a calibrated adjusting nut, a link connection for said lever to said micrometer screw, a work rest pivotally mounted on said support and provided with a roller positioned to engage the work in approximately 180° angular relation to said tool, an adjusting screw for said work rest, a second work rest pivotally mounted on said support and provided with a roller adapted to engage the work at approximately 90° angular relation to said tool, and an adjusting screw for said second work rest, said work rests and tool coacting to laterally support the work and said work rests acting to sustain the cutting thrust and stresses of the tool upon the work.

3. In a machine of the class described including a head stock, a tool carriage and a tool post adjustably mounted on said carriage, the combination of a combined tool holder and work rest support provided with a shank engageable with said tool post and when mounted thereon adapted to overhang work driven by the head stock, an angled lever-like tool holder pivotally mounted on said support adjacent the angle thereof with one arm depending at the front side of the work and the other projecting rearwardly above the work, a tool mounted on the depending arm of said tool holder, a lever pivotally mounted on the other arm of said tool holder, a micrometer screw on said support provided with a calibrated adjusting nut constituting a support engaging thrust member for said screw, a link connecting said lever to said screw, a stop for limiting the actuating throw of said lever, a plurality of work rests adjustably mounted on said support to coact with the work in different angular relations to the tool to laterally support the work and sustain the cutting thrust of the tool upon the work, said tool rests engaging the work in a plane closely adjacent the plane of the tool, and screw means for independently adjusting said work rests.

4. In a machine of the class described including a head stock, a tool carriage and a tool post slidably mounted on said carriage, the combination of a combined tool holder and work rest support provided with a shank engageable with said tool post and when mounted thereon adapted to overhang work driven by the head stock, an angled lever-like tool holder pivotally mounted on said support adjacent the angle thereof with one arm depending at the front side of the work and the other projecting rearwardly above the work, a tool mounted on the depending arm of said tool holder, a lever pivotally mounted on the other arm of said tool holder, a micrometer screw on said support provided with a calibrated adjusting nut constituting a support engaging thrust member for said screw, a link connecting said lever to said screw, and a stop for limiting the actuating throw of said lever.

5. In a machine of the class described including a head stock, a tool carriage and a tool post on said carriage, the combination of a combined tool holder and work rest support mounted on said tool post to overhang work driven by the head stock, an angled lever-like tool holder pivotally mounted on said support adjacent the angle thereof with one arm depending at the front side of the work and the other projecting rearwardly above the work, a tool mounted on the depending arm of said tool holder, a lever pivotally mounted on the other arm of said tool holder, a micrometer screw on said support provided with a calibrated adjusting nut constituting a support engaging thrust member for said screw, a link connecting said lever to said screw, a stop for limiting the actuating throw of said lever, a plurality of work rests adjustably mounted on said support to coact with the work in different angular relations to the tool to laterally support the work and sustain the cutting thrust of the tool upon the work, said tool rests engaging the work in a plane closely adjacent the plane of the tool, and screw means for independently adjusting said work rests.

6. In a machine of the class described including a head stock, a tool carriage and a tool post on said carriage, the combination of a combined tool holder and work rest support mounted on said tool post to overhang work driven by the head stock, an angled lever-like tool holder pivotally mounted on said support adjacent the angle thereof with one arm depending at the front side of the work and the other projecting rearwardly above the work, a tool mounted on the depending arm of said tool holder, a lever pivotally mounted on the other arm of said tool holder, a micrometer screw on said support provided with a calibrated adjusting nut constituting a support engaging thrust member for said screw, a link connecting said lever to said screw, and a stop for limiting the actuating throw of said lever.

7. In a machine of the class described including a head stock, a tool carriage and a tool post on said carriage, the combination of a combined tool holder and work rest support mounted on said tool post to overhang work driven by the head stock, an angled lever-like tool holder pivotally mounted on said support adjacent the angle thereof with one arm depending at one side of the work and the other projecting above the work, a tool mounted on the depending arm of said tool holder, actuating means for said tool holder mounted on the other arm thereof, a micrometer means for controlling the throw of said tool holder when actuated by said actuating means, a plurality of work rests adjustably mounted on said support to coact with the work in different angular relations to the tool to laterally support the work and sustain the cutting thrust of the tool upon the work, said tool rest engaging the work in a plane closely adjacent the plane of the tool, and screw means for independently adjusting said work rest.

8. In a machine of the class described including a head stock, a tool carriage and a tool post on said carriage, the combination of a combined tool holder and work rest support mounted on said tool post to overhang work driven by the head stock, an angled lever-like tool holder pivotally mounted on said support adjacent the angle thereof with one arm depending at one side of the work and the other projecting above the work, a tool mounted on the depending arm of said tool holder, actuating means for said tool holder, and a micrometer means for controlling the throw of said tool holder when actuated by said actuating means.

9. The combination with a head stock of a tool carriage and tool post carried thereby, a support provided with a shank engageable with said tool post, an angled tool holder pivotally mounted on said support adjacent its angle and with one arm depending at the side of the work and adapted to receive a tool, the other arm projecting rearwardly above the work, a retracting spring for said tool holder, an actuating lever pivotally mounted on the rearwardly projecting arm of said tool holder, a thrust element on said support provided with micrometer adjusting means, a link connection for said lever to said thrust element, means limiting the throw of said actuating lever, and a plurality of work rests adjustably mounted on said support to coact with the work in different angular relations to the tool to laterally support the work and sustain the cutting thrust of the tool thereon.

10. The combination with a head stock of a tool carriage and tool post carried thereby, a support provided with a shank engageable with said tool post, an angled tool holder pivotally mounted on said support adjacent its angle and with one arm depending at the side of the work and adapted to receive a tool, the other arm projecting rearwardly above the work, a retracting spring for said tool holder, an actuating lever pivotally mounted on the rearwardly projecting arm of said tool holder, a thrust element on said support provided with micrometer adjusting means, a link connection for said lever to said thrust element, and means limiting the throw of said actuating lever.

11. The combination with a head stock of a tool carriage and tool post carried thereby, a support provided with a shank engageable with said tool post, a tool holder pivotally mounted on said support adjacent its angle and with one end depending at the side of the work and adapted to receive a tool, the other end projecting rearwardly above the work, a retracting spring for said tool holder, an actuating lever pivotally mounted on the rearwardly projecting end of said tool holder, an adjustable thrust element on said support, said lever being operatively associated with said thrust element, and a plurality of work rests adjustably mounted on said support to coact with the work in different angular relations to the tool to laterally support the work and sustain the cutting thrust of the tool thereon.

12. A fixture for lathes comprising a combined tool holder and work rest support adapted to be mounted on the tool carriage of a lathe as an assembled unit, an angled lever-like tool holder pivotally mounted on said support at the angle thereof, a tool mounted on one arm of said tool holder, an actuating lever pivotally mounted on the other arm of said lever, a micrometer adjusting means on said support, and a link connection for said lever to said micrometer adjusting means, said micrometer adjusting means constituting a thrust element for said link connection.

13. A fixture for lathes comprising a combined tool holder and work rest support adapted to be mounted on the tool carriage of a lathe as an assembled unit, an angled lever-like tool holder pivotally mounted on said support at the angle thereof, a tool mounted on one arm of said tool holder, an actuating lever pivotally mounted on the other arm of said lever, an adjusting means on said support operatively associated with said lever, said adjusting means constituting a thrust element for said lever.

14. In a machine of the class described including a head stock, a tool carriage and a tool post adjustably mounted on the tool carriage, a support mounted on said tool post, an angled lever-like tool holder pivotally mounted on said support at the angle thereof with one arm depending at the side of the work and the other projecting rearwardly above the work, a tool mounted on the depending arm of said tool holder, a retracting spring for said tool holder, a micrometer screw on said support, a tool holder adjusting lever pivoted on the rearwardly projecting arm of said tool holder, and a link connection for said lever to said micrometer screw, the point of the tool at approximately the central point of its travel to and from the work being in a plane substantially at right angles to a plane through the pivot axis of the holder and the point of pivotal attachment for the tool holder actuating lever to the tool holder, the cutting edge of the tool swinging in the arc of a circle passing through such pivotal point of attachment of the actuating lever to the tool holder.

15. In a machine of the class described including a head stock, a tool carriage and a tool post adjustably mounted on the tool carriage, a support mounted on said tool post, an angled lever-like tool holder pivotaly mounted on said support at the angle thereof with one arm depending at the side of the work and the other projecting rearwardly above the work, a tool mounted on the depending arm of said tool holder, and a tool holder adjusting lever pivoted on the rearwardly projecting arm of said tool holder, the point of the tool at approximately the central point of its travel to and from the work being in a plane substantialy at right angles to a plane through the pivot axis of the holder and the point of pivotal attachment for the tool holder actuating lever to the tool holder, the cutting edge of the tool swinging in the arc of a circle passing through such pivotal point of attachment of the actuating lever to the tool holder.

16. A fixture for lathes comprising a support adapted to be mounted on a tool post of a lathe, an angled lever-like tool holder pivotally mounted on said support at the angle thereof with one arm depending at the side of the work and the other projecting rearwardly above the work, a tool mounted on the depending arm of said tool holder, and a tool holder actuating means pivoted on the rearwardly projecting arm of said tool holder, the point of the tool at approximately the central point of its travel relative to the work being in a plane substantially at right angles to a plane through the pivot axis of the holder and the point of pivotal attachment for the tool holder actuating lever to the tool holder, the cutting edge of the tool swinging in the arc of a circle passing through such pivotal point of attachment of the actuating lever to the tool holder.

17. A fixture for lathes comprising a support adapted to be mounted on a tool post of a lathe, an angled lever-like tool holder pivotally mounted on said support at the angle thereof with one arm depending at the side of the work and the other projecting rearwardly above the work, a tool mounted on the depending arm of said tool holder, and a tool holder actuating means pivoted on the rearwardly projecting arm of said tool holder, the cutting edge of the tool swinging in the arc of a circle passing through such pivotal point of attachment of the actuating lever to the tool holder.

18. The combination in a lathe, of a head stock and tool post, a support adapted to be mounted on the tool post, a tool holder pivotally mounted on said support, a tool carried by said tool holder, means for actuating said tool holder on its pivot, an adapter for non-circular stock adapted to slidably engage the stock and having an annular peripheral groove, and a plurality of work rests adjustably mounted on said supports and provided with rollers coacting with said adapter groove in different angular relations to the tool to laterally support the work and sustain the cutting thrust of the tool thereon, said adapter being moved axially of the work by the engagement of said work rests with said groove thereof.

19. A fixture for lathes and the like comprising a support member, an angled tool holder pivotally mounted on said support with one arm thereof depending at the side of the work, such arm being provided with a stud having an inwardly facing cammed portion, a tool supporting fixture having an opening therein adapted to receive said stud with a cammed portion engaging the cammed portion of said stud whereby the fixture is urged towards the side of the tool holder, said tool fixture having a tool seat, an adjusting means for said tool holder pivotally mounted on the other arm thereof and having a thrust connection with said support, and a retracting spring for said tool holder.

20. A fixture for engine lathes and the like comprising a support member provided with a shank adapted to be engaged with the tool post of a lathe, a tool holder adjustably mounted on said support, and adjusting means for said tool holder carried by said support, a work rest pivotally mounted on said tool holder and provided with a work engaging roller positioned to engage the work in angularly spaced relation to the tool, an adjusting screw for said work holder, a supporting block for said adjusting screw having a threaded bore therein, said block having intersecting slots therein intersecting said bore and providing a tongue constituting a part of the threaded screw receiving bore, said tongue being deflected inwardly to springably engage the adjusting screw and constituting a locking means therefor, said block having a pin thereon, a pin on said work rest, and a retracting spring for said work rest connected to said pins whereby said spring acts to retract said work rest.

21. A fixture for engine lathes and the like comprising a support member provided with a shank adapted to be engaged with the tool post of a lathe, a tool holder adjustably mounted on said support, an adjusting means for said tool holder carried by said support, a work rest pivotally mounted on said tool holder and provided with a work engaging roller positioned to engage the work in angularly spaced relation to the tool, an adjusting screw for said work holder, and a supporting block for said adjusting screw having a threaded bore therein, said block having intersecting slots therein intersecting said bore and providing a tongue constituting a part of the threaded screw receiving bore, said tongue being deflected inwardly to springably engage the adjusting screw and constituting a locking means therefor.

22. A fixture for lathes and the like comprising a support member, a tool holder pivotally mounted on said support member with a portion thereof depending at the side of the work, said tool holder being provided with a stud having an inwardly facing cammed portion, a tool supporting fixture provided with a tool seat and having an opening therein adapted to receive said stud with a cammed portion coacting with the cammed portion of the stud whereby the fixture is urged toward the side of the holder by load imposed thereon, said tool holder having an abutment for sustaining tool cutting load rearward thrust on the fixture, and means for adjusting said tool holder whereby a tool carried by the fixture may be advanced to the work.

23. A fixture for lathes and the like comprising a support member, a tool holder pivotally mounted on said support to be moved to and from the work, the tool holder being provided with a stud having an inwardly facing cammed top portion, a tool supporting fixture provided with a tool seat and having an opening therein receiving said stud, the opening being provided with a cammed portion coacting with the cammed portion of the stud whereby the fixture is urged towards the side of the tool, the tool holder also having an abutment sustaining the rearward thrust of said fixture and limiting the rearward movement thereon on said pivot, and a feed means for swinging said tool holder on its pivot for advancing the tool carried by said fixture to the work.

24. A fixture for lathes and the like comprising a support member, a tool holder movably mounted on said support member to depend at the side of the work, said tool holder being provided with a stud having an inwardly facing cammed upper portion, and a tool supporting fixture having an outwardly facing cammed portion coacting with said cammed portion of said stud whereby the fixture is urged towards the side of the tool holder, said support being provided with an abutment sustaining the rearward thrust of said tool fixture, said tool fixture having a seat adapted to support a tool in such relation to the work that the cutting load on the tool tends to urge the coacting cammed portions of the stud and fixture into thrust engagement and to urge the tool fixture against said abutment, and means for advancing said tool holder to the work.

25. A fixture for lathes and the like comprising a support member, a tool holder mounted on said support member to depend at the side of the work, said tool holder being provided with a stud having an inwardly facing cammed upper portion, a tool supporting fixture provided with a tool seat and having an outwardly facing cammed portion coacting with said cammed portion of said stud whereby the fixture is urged towards the side of the tool holder by the downward thrust cutting load of the tool, said support being provided with an abutment sustaining the rearward thrust of said tool fixture in opposition to the rear thrust cutting load of the tool, and means for advancing said tool holder to the work.

GEORGE MELLING, Sr.